(12) United States Patent
Kemmerer et al.

(10) Patent No.: US 9,854,741 B2
(45) Date of Patent: Jan. 2, 2018

(54) CONTROL SYSTEM AND METHOD FOR CONTROLLING TWO BANKS OF ADJUSTABLE VANES ON A CYLINDRICAL ROTOR CAGE OF AN AGRICULTURAL HARVESTER

(71) Applicant: CNH Industrial America LLC, New Holland, PA (US)

(72) Inventors: Benjamin Kemmerer, New Holland, PA (US); Joshua A. Lesher, Bernville, PA (US); Wayne T. Flickinger, Oxford, PA (US)

(73) Assignee: CNH Industrial America LLC, New Holland, PA (US)

( * ) Notice: Subject to any disclaimer, the term of this patent is extended or adjusted under 35 U.S.C. 154(b) by 30 days.

(21) Appl. No.: 15/155,342

(22) Filed: May 16, 2016

(65) Prior Publication Data

US 2017/0325406 A1   Nov. 16, 2017

(51) Int. Cl.
*A01F 12/28*   (2006.01)
*A01F 7/06*    (2006.01)
*A01F 12/20*   (2006.01)
*A01F 12/18*   (2006.01)
*A01F 12/44*   (2006.01)
*A01F 12/24*   (2006.01)
*A01F 12/46*   (2006.01)

(52) U.S. Cl.
CPC ............ *A01F 12/181* (2013.01); *A01F 7/062* (2013.01); *A01F 12/24* (2013.01); *A01F 12/446* (2013.01); *A01F 12/46* (2013.01)

(58) Field of Classification Search
CPC .. A01F 12/18; A01F 7/06; A01F 7/067; A01F 7/062; A01F 12/181; A01F 12/20; A01F 12/28

USPC ............................................... 460/66, 62, 72
See application file for complete search history.

(56) References Cited

U.S. PATENT DOCUMENTS

| 4,244,380 A | * | 1/1981 | DePauw | ................. | A01F 7/067 |
| | | | | | 460/108 |
| 7,473,170 B2 | | 1/2009 | McKee et al. | | |
| 9,282,696 B2 | * | 3/2016 | Regier | ................... | A01F 12/28 |

(Continued)

FOREIGN PATENT DOCUMENTS

| CN | 203057867 U | 7/2013 |
| DE | 10 2005 036 675 A1 | 2/2007 |

OTHER PUBLICATIONS

European Search Report; EP 17171203; dated Aug 9, 2017.

*Primary Examiner* — John G Weiss
(74) *Attorney, Agent, or Firm* — Patrick M. Sheldrake

(57) ABSTRACT

A threshing system including a rotor cage with a plurality of slots therein, a first bank of vanes and a second bank of vanes arranged within the cage. An adjustable vane control system is coupled to the rotor cage and the banks of vanes. A first and second member are respectively pivotally coupled the vanes in the first bank and the vanes of the second bank through corresponding slots. Linkages couple an arm to the members. The first and second members each having a range of travel defined by the slots. The members each having a surface facing the outer surface of the rotor cage, the surfaces of the first member and the second member each remain tangent to the outer surface of the rotor cage as the first member and the second member are moved within their range of travel.

20 Claims, 6 Drawing Sheets

(56) References Cited

U.S. PATENT DOCUMENTS

2011/0320087 A1 12/2011 Farley et al.
2016/0000009 A1 1/2016 DuQuesne et al.

* cited by examiner

CONTROL SYSTEM AND METHOD FOR CONTROLLING TWO BANKS OF ADJUSTABLE VANES ON A CYLINDRICAL ROTOR CAGE OF AN AGRICULTURAL HARVESTER

BACKGROUND OF THE INVENTION

1. Field of the Invention

The present invention relates to agricultural harvesters such as combines, and, more particularly, to adjustable vane control systems used with a threshing rotor in a crop processing section of the combine.

2. Description of the Related Art

An agricultural harvester known as a "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. The threshing rotor is provided with rasp bars that interact with the crop matter in order to further separate the grain from the crop matter, and to provide positive crop movement.

Once the grain is threshed it falls through perforations in the concaves and is transported to a grain pan. From the grain pan the grain is cleaned using a cleaning system, and is then transported to a grain tank onboard the combine. The cleaning system includes a cleaning fan which blows air through oscillating sieves to discharge chaff and other debris toward the rear of the combine. Non-grain crop material such as straw from the threshing section proceeds through a straw chopper and out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

More particularly, a rotary threshing or separating system includes one or more threshing rotors which can extend axially (front to rear) or transversely within the body of the combine, and which are partially or fully surrounded by a perforated concave. Again, the one or more threshing rotors are provided with rasp bars that interact with the crop matter to separate grain and to provide positive crop movement. The crop material is threshed and separated by the rotation of the rotor within the concave. Coarser non-grain crop material such as stalks and leaves are transported to the rear of the combine and discharged back to the field. The separated grain, together with some finer non-grain crop material such as chaff, dust, straw, and other crop residue are discharged through the concaves and fall onto the grain pan where they are transported to the cleaning system. Alternatively, the grain and finer non-grain crop material may also fall directly onto the cleaning system itself.

The cleaning system further separates the grain from non-grain crop material, and typically includes a fan directing an air flow stream upwardly and rearwardly through vertically arranged sieves which oscillate in a fore and aft manner. The airflow stream lifts and carries the lighter non-grain crop material towards the rear end of the combine for discharge to the field. Clean grain, being heavier, and larger pieces of non-grain crop material, which are not carried away by the air flow stream, fall onto a surface of an upper sieve (also known as a chaffer sieve or sieve assembly) where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material remaining on the top surface of the upper sieve or sieve assembly are discharged at the rear of the combine. Grain falling through the lower sieve lands on a bottom pan of the cleaning system, where it is conveyed forwardly toward a clean grain auger. The clean grain auger is positioned below the lower sieve, and receives clean grain from each sieve and from the bottom pan of the cleaning system. The clean grain auger then augers the clean grain laterally sideways to a clean grain elevator, which in turn conveys the clean grain to a grain tank onboard the combine.

Variable pitch vanes within the rotor cage can bind as the vanes are moved causing them to be less effective than is desired. The binding is generally caused by trapped crop material that wedges beneath the vanes.

Accordingly, what is needed in the art is a way to control the pitch of the vanes in a manner that has a non-binding or reduced binding characteristic and is cost effective.

SUMMARY OF THE INVENTION

The present invention provides a pivoting vane adjustment system in the threshing system of an agricultural harvester.

In one form, the invention is directed to a threshing system including a rotor cage with a plurality of slots therein, a first bank of vanes and a second bank of vanes arranged within the cage. An adjustable vane control system is coupled to the rotor cage and the banks of vanes. a first and second member are respectively pivotally coupled the vanes in the first bank and the vanes of the second bank through corresponding slots. Linkages couple an arm to the members. The first and second members each having a range of travel defined by the slots. The members each having a surface facing the outer surface of the rotor cage, the surfaces of the first member and the second member each remain tangent to the outer surface of the rotor cage as the first member and the second member are moved within their range of travel.

In another form, the invention is directed to an agricultural harvester including a chassis and a threshing system carried by the chassis, the threshing system for separating grain from Material Other than Grain (MOG). The threshing system has a rotor cage with a plurality of slots therein, the rotor cage having an outer generally cylindrical surface; a plurality of banks of adjustable vanes pivotally coupled to the rotor cage including a first bank of vanes and a second bank of vanes; and an adjustable vane control system coupled to the rotor cage. The adjustable vane control system includes a first member pivotally coupled to each of the vanes in the first bank of vanes through corresponding slots; a second member pivotally coupled to each of the vanes in the second bank of vanes through corresponding slots; a first linkage; a second linkage; and an arm. The arm has an end that is coupled to the first member by way of the first linkage. The arm also has an opposite end that is coupled to the second member by way of the second linkage. The first member and the second member each have a range of travel defined by the slots. The first member and the second member each have a surface facing the outer surface of the rotor cage. The surface of the first member and the surface of the second member each remaining tangent to the outer surface of the rotor cage as the first member and the second member are moved within their range of travel.

An advantage of the present invention is that the vanes are efficiently moved by a balanced adjustment system, and the vanes are spaced and provide for some movement in an axial direction relative to the rotor cage.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates an embodiment of the invention, in one form, and such exemplification is not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
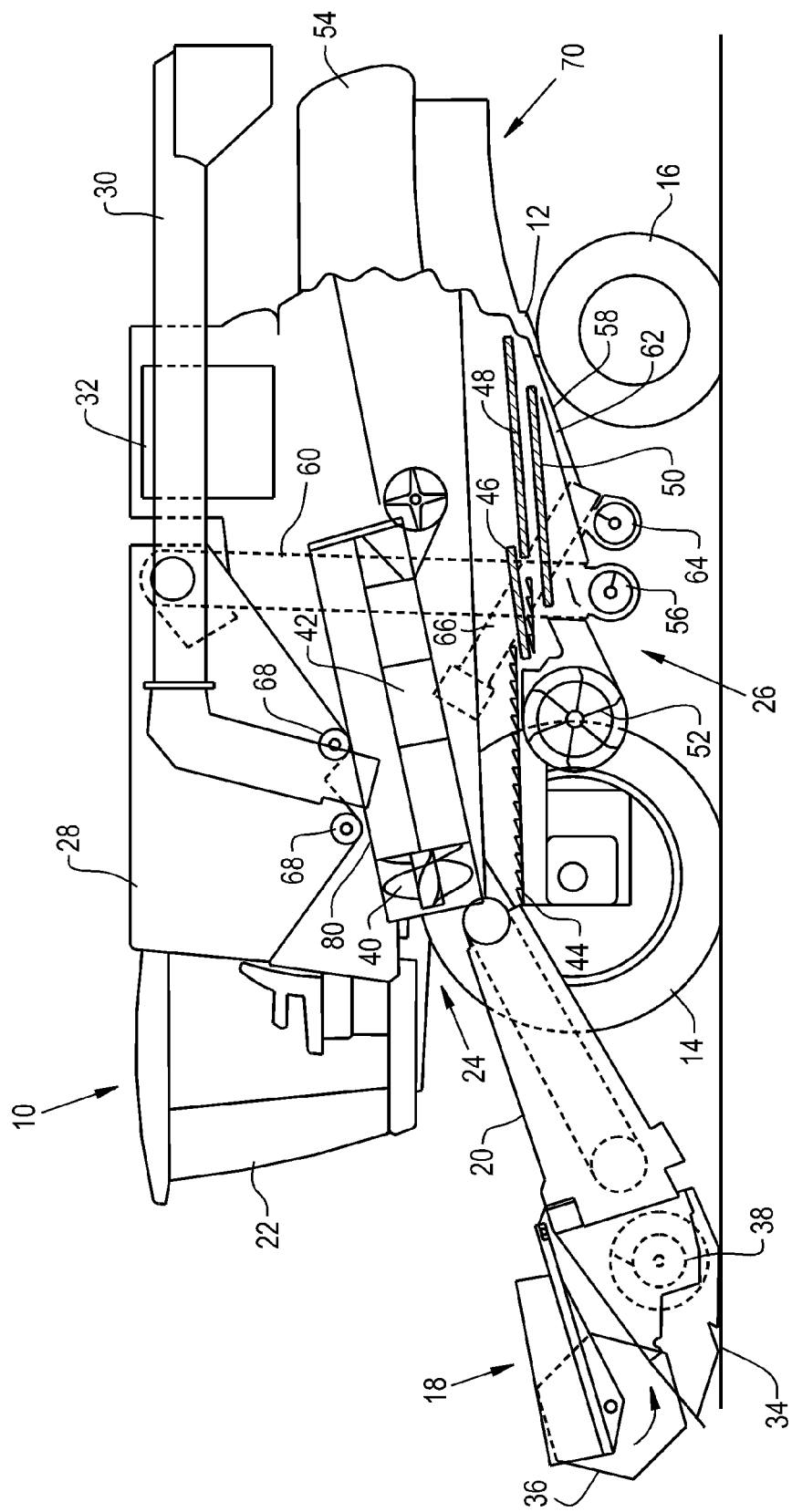
FIG. 1 is a side view of an agricultural harvester in the form of a combine.

Referring now to the drawings, and more particularly to FIG. 1, there is shown an agricultural harvester in the form of a combine 10, which generally includes a chassis 12, ground engaging wheels 14 and 16, header 18, feeder housing 20, operator cab 22, threshing and separating system 24, cleaning system 26, grain tank 28, and unloading conveyance 30. Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or half tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 is of the axial-flow type, and generally includes a threshing rotor 40 at least partially enclosed by a rotor cage and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42. Threshing and separating system 24 can also be a different type of system, such as a system with a transverse rotor rather than an axial rotor, etc.

Grain which has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve or sieve assembly), a lower sieve 50 (also known as a cleaning sieve), and a cleaning fan 52. Grain on sieves 46, 48 and 50 is subjected to a cleaning action by fan 52 which provides an air flow through the sieves to remove chaff and other impurities such as dust from the grain by making this material airborne for discharge from straw hood 54 of the residue handling system 70 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and toward the front of lower sieve 50. Clean grain auger 56 receives clean grain from each sieve 48, 50 and from bottom pan 58 of cleaning system 26. Clean grain auger 56 conveys the clean grain laterally to a generally vertically arranged grain elevator 60 for transport to grain tank 28. Tailings from cleaning system 26 fall to a tailings auger trough 62. The tailings are transported via tailings auger 64 and return auger 66 to the upstream end of cleaning system 26 for repeated cleaning action. A pair of grain tank augers 68 at the bottom of grain tank 28 convey the clean grain laterally within grain tank 28 to unloading auger 30 for discharge from combine 10.

Figure 2:
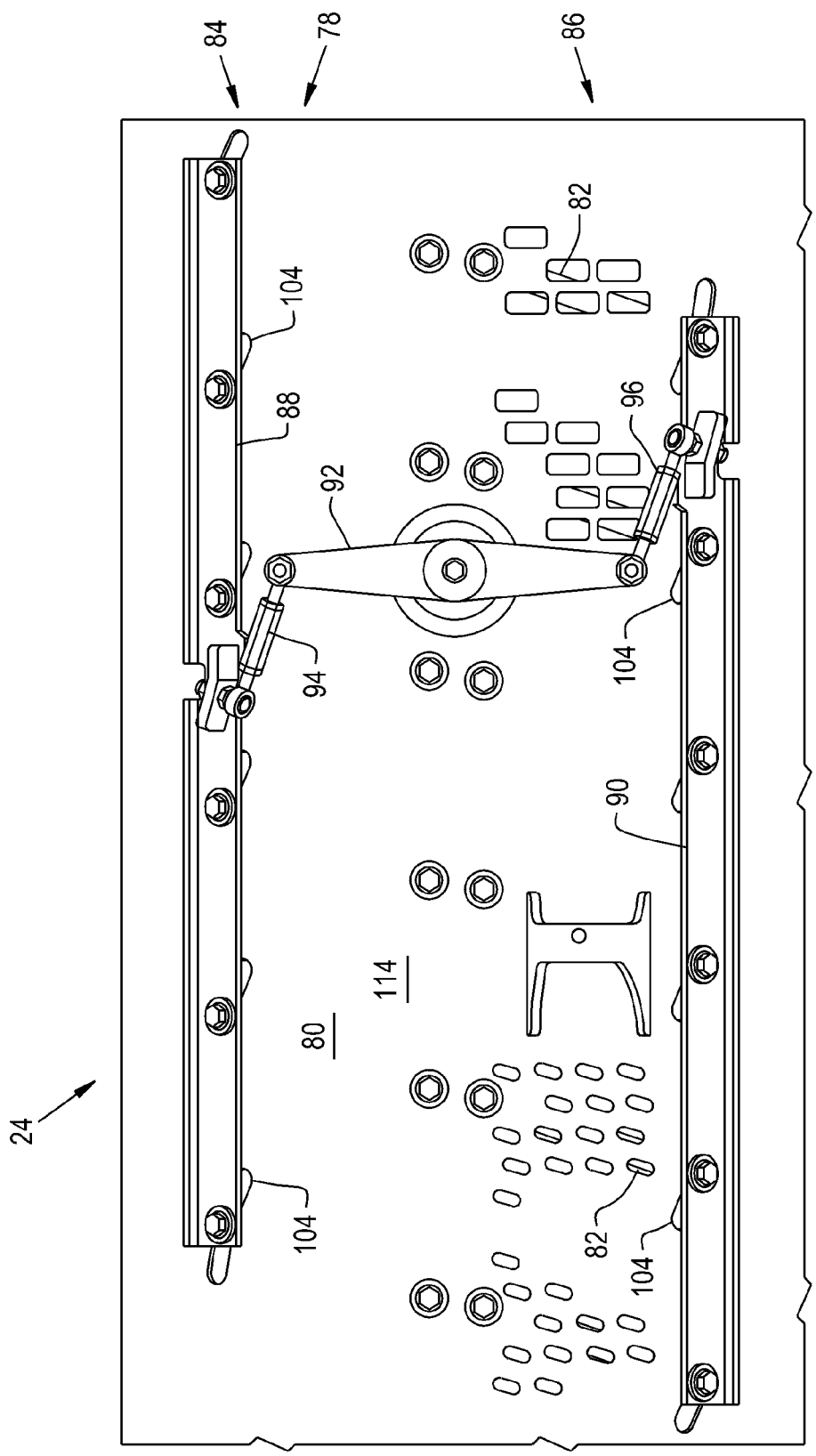
FIG. 2 is a plan view of the curved side of a rotor cage of a threshing system having an embodiment of a vane adjustment system of the present invention used in the combine of FIG. 1.
Figure 3:
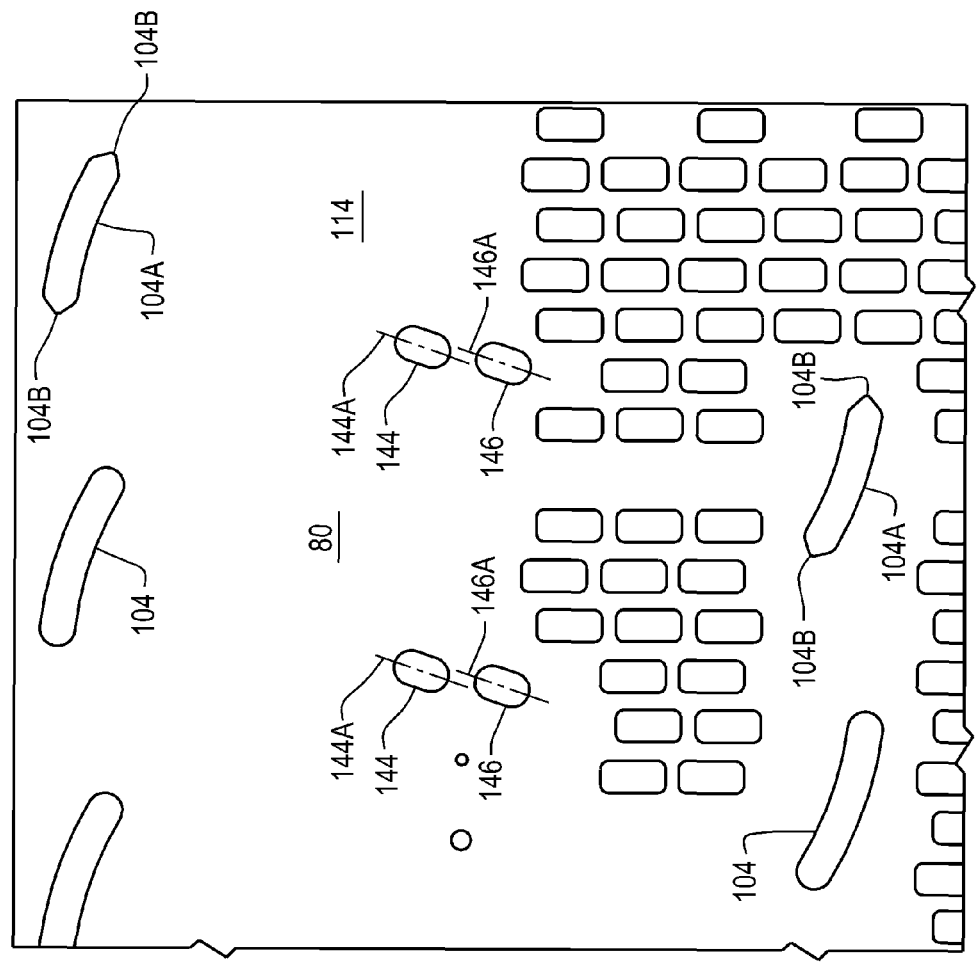
FIG. 3 is a plan view of the rotor cage of FIG. 2 with the adjustment system removed.
Figure 4:
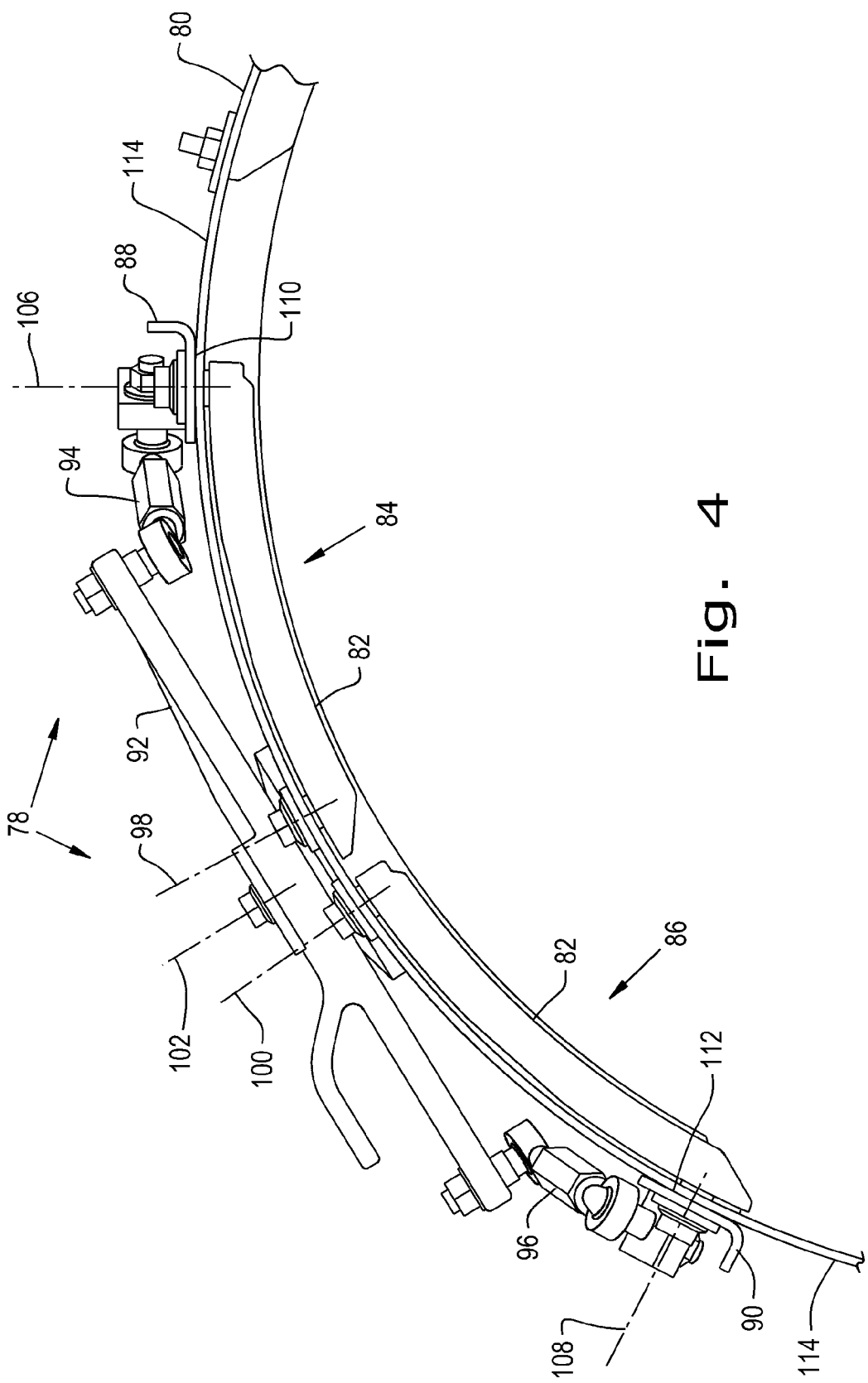
FIG. 4 is a sectioned end vies of the rotor cage of FIGS. 2 and 3 with the vane adjustment system seen in profile.

Now, additionally referring to FIGS. 2-4 there is shown a partial view of threshing system 24, more particularly showing vane adjustment system 78 coupled to a rotor cage 80 with vanes 82 positioned along an inner surface of cage 80 in banks 84 and 86 of vanes 82. A sliding member 88 is pivotally coupled to one end of vanes 82 of bank 84, and sliding member 90 is pivotally coupled to an end of vanes 82 of bank 86. An arm 92 is pivotally coupled to cage 80 and is coupled to member 88 by way of a linkage 94 and to member 90 by way of a linkage 96.

Vanes 82 of bank 84 are pivotally attached about axes 98 to rotor cage 80 and vanes 82 of bank 86 are pivotally coupled to rotor cage 80 about axes 100. Arm 92 is pivotally coupled to rotor cage 80 about an axis 102. Vanes 82 of bank 84 are pivotally coupled to sliding member 88 though slots 104 about an axes 106, which are arcuately shaped to correspond to a pivotal range of travel of vanes 82. In a like manner vanes 82 of bank 86 are pivotally coupled to sliding member 90 though slots 104 about axes 108, which are arcuately shaped to correspond to a pivotal range of travel of vanes 82 of bank 86. Slots 144 and 146 are where vanes 82 pivot respectively about axes 98 and 100. As can be seen in FIG. 3 slots 144 and 146 are offset from each other as illustrated by the alignment lines 144A and 146A that illustrate the general longitudinal axis of the underlying vanes 82 approximately positioned at a midpoint of pivoting in slots 104. Some offset exists regardless of the pivotal position of vanes 82. This offset ensures that vanes 82 are always shingled properly as crop material transitions off the trailing end of the vanes 82 in bank 86 and interacts with the leasing end of vanes 82 of bank 84. Slots 144 and 146 are positioned in such a way that this shingling effect is present regardless of any vane position within curved slots 104.

Members 88 and 90 each have a respective inner surface 110 and 112 that remains tangent to an outer surface 114 of rotor cage 80 over the entire range of movement of members 88 and 90. As arm 92 is pivoted the pivotal movement of vanes 82 takes place in a coordinated manner with force being transmitted from arm 92 to members 88 and 90 respectively by linkages 94 and 96. The full range of movement of vanes 82 is subject to slots 104A, which are a modified version of slots 104. Slots 104 are generally oversize to allow space so that if any crop material gets into the slots 104 that the full range of motion of vane adjustment system 78 can still take place. However slots 104A are slightly shortened and have a reduced throat 104B feature that serves as a hard stop for the motion of adjustment system 78.

Axes 98, 100, 102, 106 and 108 are all substantially normal to surface114. Even axes 106 and 108 which move along the curved outer surface 114, due to the shape and location of slots 104, remain normal to surface 114 over their range of movement.

Figure 5:
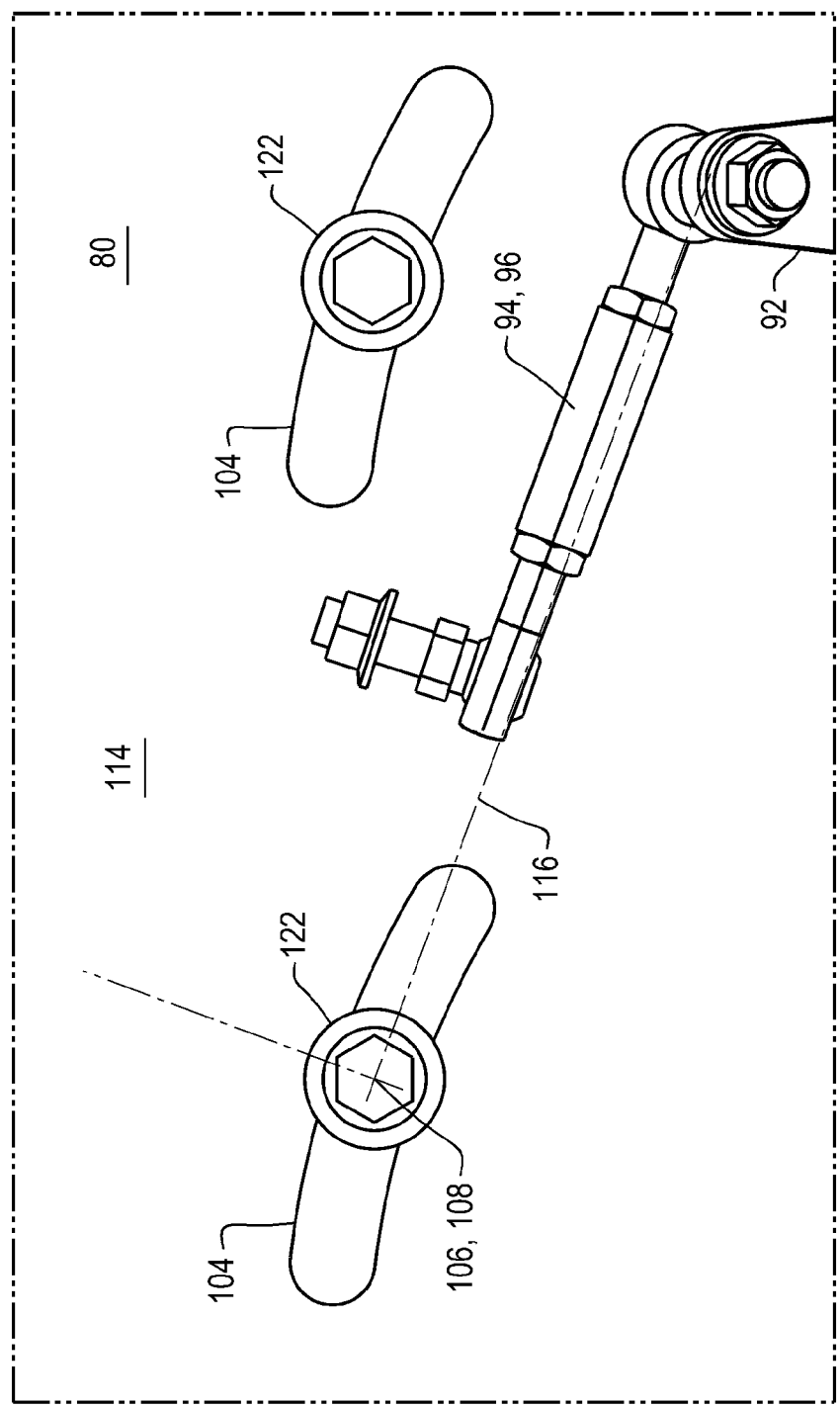
FIG. 5 is a view of part of the vane adjustment system of FIGS. 2 and 4 with some elements removed to illustrate some geometric relationships of elements of the vane adjustment system.

Now, additionally referring to FIG. 5 there is shown some further details about adjustment system 78. Here member 88 or 90 is omitted for the sake of clarity with linkage 94 or 96 shown connected to arm 92 and oriented as if linkage 94/96 were coupled to member 88/90. Linkage 94/96 has a longitudinal axis 116 that is parallel with a tangent of the movement of the point represented by axis 106 or 108, which is the pivot point between member 88/90 and vanes 82. Here this relationship is illustrated with longitudinal axis 116 intersecting an axis 106 at the midpoint of travel of axis 106/108 within slot 104.

Figure 6:
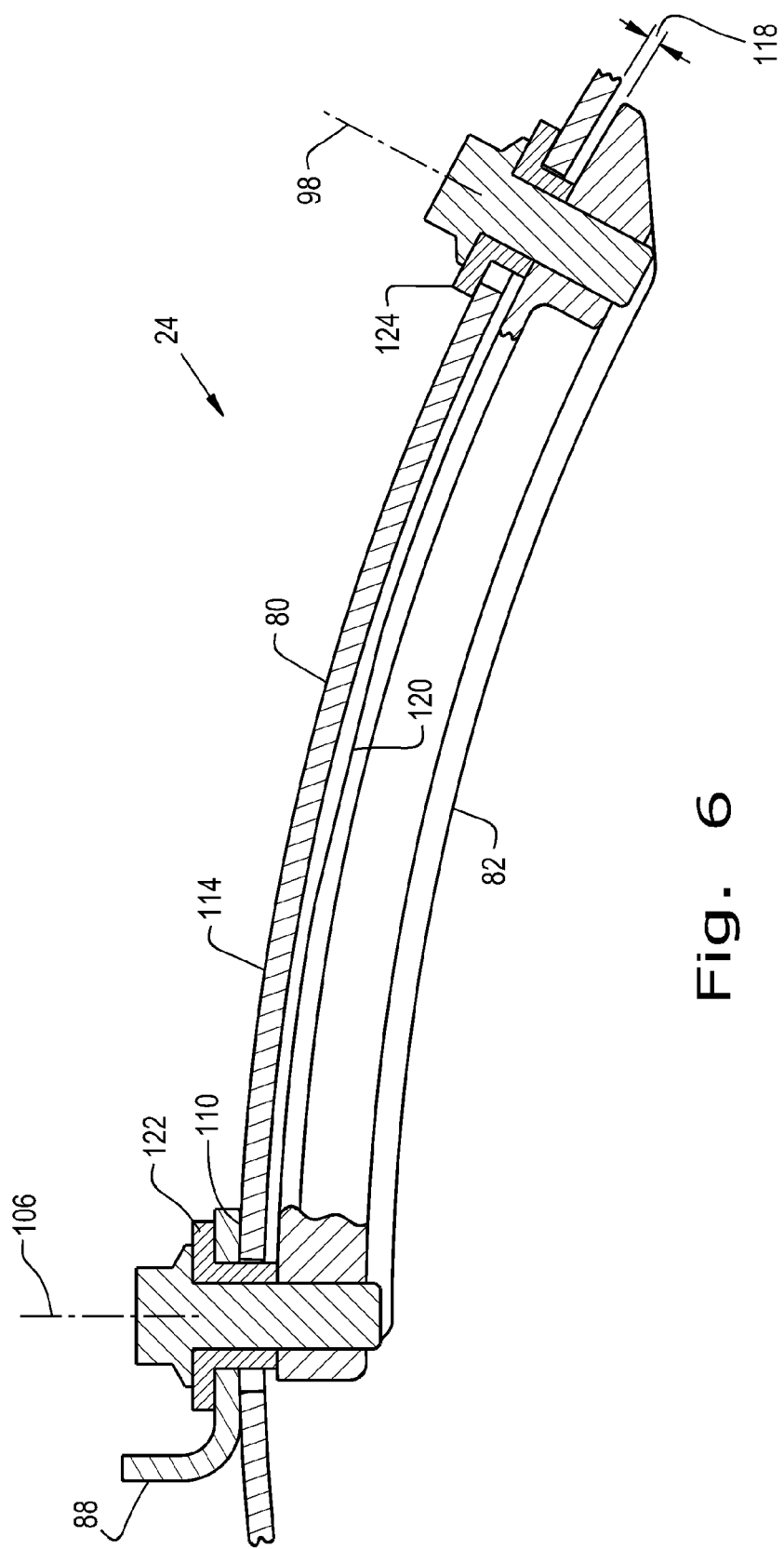
FIG. 6 is a view of an embodiment of one of the vanes of the present invention coupled to the vane adjustment system.

Now, additionally referring to FIG. 6, there is shown a closer view of one of vanes 82 with a cross-sectional view of cage 80 where vane 82 is shown spaced a distance 118 from cage 80 when crop material is not pressing against vane 82. Vane 82 has a flat portion 120 midway between axis 98 and axis 106. Vane 82 can move distance 118 due to the spacing allowed by shoulder bushings 122 and 124. Although, the movement of vane 82 is shown as influenced by gravity, it is also contemplated that a biasing feature could be used. The free movement of vane 82 in an axial direction in and out relative to cage 80 allows for crop material to disengage from between vane 82 and cage 80. Distance 118 is a predefined distance such as 4 mm.

The flat portion 120 of vane 82 is there to compensate for the change in curvature geometry between cage 80 and vanes 82, as vanes 82 are pivoted about axes 98 and 100. Flat portion 120 allows a needed clearance when members 88 and 90 are slid.

The present invention advantageously provides rotor cage 80 slot 104 geometry that constrains vanes 82 to defined pivotal path. Slots 104 provide a greater range of movement tan necessary to ensure that crop material build up never limits the full range of motion. Slots 104A, which are one of the slots 104 in each bank 84 and 86 is notched at 104B to provide a hard stop at either end of the desired range of motion. Adjustment arm 92 rotates or pivots about axis 102 providing an equal and opposite motion to vane banks 84 and 86. Axis 102 is perpendicular to rotor cage 80. The adjustment of vane banks 84 and 86 occurs on two separate planes which are moved along cage 80 by way of spherical rod ends on linkages 94 and 96. Positioning of linkages 94 and 96 from arm 92 to vane rails 88 and 90 is such that they are parallel to the motion of axes 106 and 108 in slots 104 at a center of slots 104 to thereby generate an optimal use of the force available to adjust vanes 82. An actuating system to move arm 92 has been purposely omitted for the sake of clarity in the presentation of the present invention.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A threshing system for use in an agricultural harvester, the threshing system comprising:
   a rotor cage with a plurality of slots therein, the rotor cage having an outer generally cylindrical surface;
   a plurality of banks of adjustable vanes pivotally coupled to the rotor cage including a first bank of vanes and a second bank of vanes; and
   an adjustable vane control system coupled to the rotor cage, the adjustable vane control system including:
   a first member pivotally coupled to each of the vanes in the first bank of vanes through corresponding ones of the slots;
   a second member pivotally coupled to each of the vanes in the second bank of vanes through corresponding ones of the slots;
   a first linkage;
   a second linkage; and
   an arm having an end that is coupled to the first member by way of the first linkage, the arm having an opposite end that is coupled to the second member by way of the second linkage, the first member and the second member each having a range of travel defined by the slots, the first member and the second member each having a surface facing the outer surface of the rotor cage, the surface of the first member and the surface of the second member each remaining tangent to the outer surface of the rotor cage as the first member and the second member are moved within their range of travel.

2. The threshing system of claim 1, wherein the first linkage has a longitudinal axis that is arranged to be substantially parallel to a tangent of the slots associated with the first bank of adjustable vanes when the first member is approximately at a midpoint in the range of travel.

3. The threshing system of claim 2, wherein the second linkage has a longitudinal axis that is arranged to be substantially parallel to a tangent of the slots associated with the second bank of adjustable vanes when the second member is approximately at a midpoint in the range of travel.

4. The threshing system of claim 3, wherein the first linkage and the second linkage are substantially coordinated so that the longitudinal axis of the first linkage is arranged to be substantially parallel to the tangent of the slots associated with the first bank of adjustable vanes and the longitudinal axis of the second linkage is arranged to be substantially parallel to the tangent of the slots associated with the second bank of adjustable vanes when the arm is at approximately a midpoint in a pivotal range of motion of the arm.

5. The threshing system of claim 1, wherein a force that is applied to the first member by the first linkage and the force that is applied to the second member by the second linkage are parallel to the direction of vane travel when the first member and the second member are at a midpoint of their range of travel.

6. The threshing system of claim 1, wherein the arm is arranged generally half way between the first member and the second member.

7. The threshing system of claim 6, wherein the arm has a pivot axis that is positioned substantially half way between the first member and the second member and normal to the outer surface of the rotor cage.

8. The threshing system of claim 7, wherein the arm is arranged to allow substantially equal and opposite movement of the first bank of vanes relative to the second bank of vanes.

9. The threshing system of claim 1, wherein the slots are oversized in length to reduce crop pinching of the control system.

10. The threshing system of claim 9, wherein at least one slot has a notch that provides a hard stop to the movement of the banks of vanes.

11. The threshing system of claim 1, further comprising another plurality of slots in the rotor cage including a first set and a second set of slots, the adjustable vanes of the first bank of vanes being pivotally coupled to the rotor cage by way of the first set of slots, the adjustable vanes of the second bank of vanes being pivotally coupled to the rotor cage by way of the second set of slots, the first set of slots and the second set of slots being offset from each other relative to a flow of crop material thereby.

12. An agricultural harvester, comprising:
a chassis; and
a threshing system carried by the chassis, the threshing system for separating grain from Material Other than Grain (MOG), the threshing system including:
  a rotor cage with a plurality of slots therein, the rotor cage having an outer generally cylindrical surface;
  a plurality of banks of adjustable vanes pivotally coupled to the rotor cage including a first bank of vanes and a second bank of vanes; and
  an adjustable vane control system coupled to the rotor cage, the adjustable vane control system including:
    a first member pivotally coupled to each of the vanes in the first bank of vanes through corresponding ones of the slots;
    a second member pivotally coupled to each of the vanes in the second bank of vanes through corresponding ones of the slots;
    a first linkage;
    a second linkage; and
    an arm having an end that is coupled to the first member by way of the first linkage, the arm having an opposite end that is coupled to the second member by way of the second linkage, the first member and the second member each having a range of travel defined by the slots, the first member and the second member each having a surface facing the outer surface of the rotor cage, the surface of the first member and the surface of the second member each remaining tangent to the outer surface of the rotor cage as the first member and the second member are moved within their range of travel.

13. The agricultural harvester of claim 12, wherein the first linkage has a longitudinal axis that is arranged to be substantially parallel to a tangent of the slots associated with the first bank of adjustable vanes when the first member is approximately at a midpoint in the range of travel.

14. The agricultural harvester of claim 13, wherein the second linkage has a longitudinal axis that is arranged to be substantially parallel to a tangent of the slots associated with the second bank of adjustable vanes when the second member is approximately at a midpoint in the range of travel.

15. The agricultural harvester of claim 14, wherein the first linkage and the second linkage are substantially coordinated so that the longitudinal axis of the first linkage is arranged to be substantially parallel to the tangent of the slots associated with the first bank of adjustable vanes and the longitudinal axis of the second linkage is arranged to be substantially parallel to the tangent of the slots associated with the second bank of adjustable vanes when the arm is at approximately a midpoint in a pivotal range of motion of the arm.

16. The agricultural harvester of claim 12, wherein a force that is applied to the first member by the first linkage and the force that is applied to the second member by the second linkage are parallel to the direction of vane travel when the first member and the second member are at a midpoint of their range of travel.

17. The agricultural harvester of claim 12, wherein the arm is arranged generally half way between the first member and the second member.

18. The agricultural harvester of claim 17, wherein the arm has a pivot axis that is positioned substantially half way between the first member and the second member and normal to the outer surface of the rotor cage.

19. The agricultural harvester of claim 18, wherein the arm is arranged to allow substantially equal and opposite movement of the first bank of vanes relative to the second bank of vanes.

20. The agricultural harvester of claim 11, wherein the slots are oversized in length to reduce crop pinching of the control system, and at least one slot has a notch that provides a hard stop to the movement of the banks of vanes.

* * * * *